(12) United States Patent
Allouche

(10) Patent No.: US 7,871,526 B2
(45) Date of Patent: Jan. 18, 2011

(54) GRAVITY SEPARATOR FOR A MULTI-PHASE EFFLUENT

(75) Inventor: Francis Allouche, Nogent sur Marne (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/636,829

(22) Filed: Dec. 14, 2009

(65) Prior Publication Data

US 2010/0140140 A1 Jun. 10, 2010

Related U.S. Application Data

(62) Division of application No. 11/568,250, filed as application No. PCT/EP2005/004642 on Apr. 29, 2005, now Pat. No. 7,654,397.

(30) Foreign Application Priority Data

May 6, 2004  (EP) .................................. 04291179

(51) Int. Cl.
   *B01D 17/025* (2006.01)
(52) U.S. Cl. .................. 210/739; 210/744; 210/800
(58) Field of Classification Search .................. 210/744, 210/776, 800, 804; 166/75.12, 267
   See application file for complete search history.

(56) References Cited

U.S. PATENT DOCUMENTS

| 3,971,719 | A | 7/1976 | Peters |
| 4,094,338 | A | 6/1978 | Bauer |
| 4,512,883 | A | 4/1985 | Thompson |
| 4,998,585 | A | 3/1991 | Newcomer et al. |
| 5,106,494 | A | 4/1992 | Norcross |
| 5,132,011 | A | 7/1992 | Ferris |
| 5,143,603 | A | 9/1992 | Gibbs |
| 5,154,835 | A | 10/1992 | DeMichael |
| 5,378,353 | A | 1/1995 | Koch |
| 5,492,619 | A | 2/1996 | Batten |
| 5,601,705 | A | 2/1997 | Glasgow |
| 5,660,725 | A | 8/1997 | Klass |
| 5,693,218 | A | 12/1997 | Yamamoto et al. |
| 6,132,620 | A | 10/2000 | Robinson et al. |
| 6,183,654 | B1 | 2/2001 | Terrien et al. |
| 6,251,286 | B1 | 6/2001 | Gore |
| 6,277,287 | B1 | 8/2001 | Terrien et al. |
| 6,537,458 | B1 | 3/2003 | Polderman |
| 6,644,514 | B2 | 11/2003 | Wickins |
| 6,773,605 | B2 | 8/2004 | Nyborg et al. |
| 6,915,818 | B2 | 7/2005 | Burris et al. |

(Continued)

FOREIGN PATENT DOCUMENTS

DE          2406857          8/1975

(Continued)

*Primary Examiner*—Duane Smith
*Assistant Examiner*—Paul J Durand
(74) *Attorney, Agent, or Firm*—Matthias Abreil

(57) ABSTRACT

A method of separating a hydrocarbon multiphase fluid mixture. The method comprises an application step in which the hydrocarbon fluid mixture (E) is applied to a separator that separates by gravity the hydrocarbon fluid mixture (E) into a liquid layer and a gas layer. The method further comprises an extraction step, a liquid-level measurement step, a level-based adjustment step, a parameter measurement step, and a parameter-based adjustment step.

7 Claims, 8 Drawing Sheets

U.S. PATENT DOCUMENTS

| | | |
|---|---|---|
| 7,024,951 B2 | 4/2006 | Germond |
| 7,025,888 B2 | 4/2006 | Thompson et al. |
| 2003/0159986 A1 | 8/2003 | Amado et al. |
| 2004/0007131 A1 | 1/2004 | Chitty et al. |
| 2004/0011748 A1 * | 1/2004 | Amado et al. ............... 210/800 |

FOREIGN PATENT DOCUMENTS

| | | |
|---|---|---|
| DE | 10112339 | 3/2006 |
| EP | 0679767 | 4/1995 |
| GB | 2330780 | 5/1999 |
| WO | WO03033871 | 4/2003 |
| WO | WO0183073 | 11/2003 |

\* cited by examiner

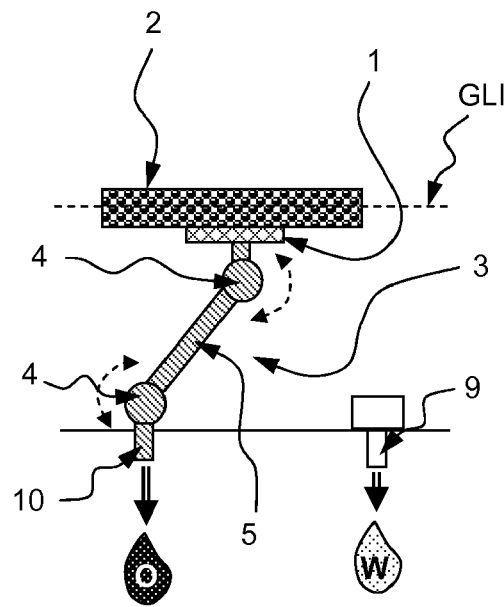
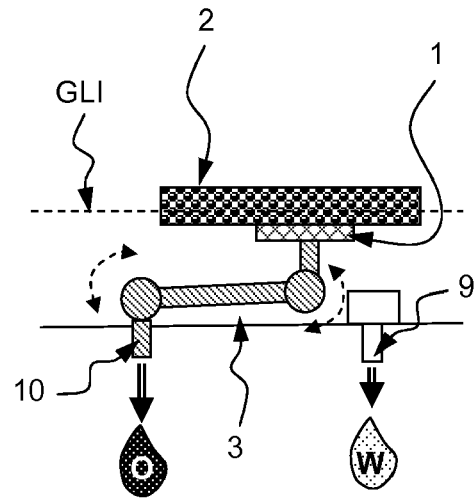
Figure 3.A
Figure 3.B
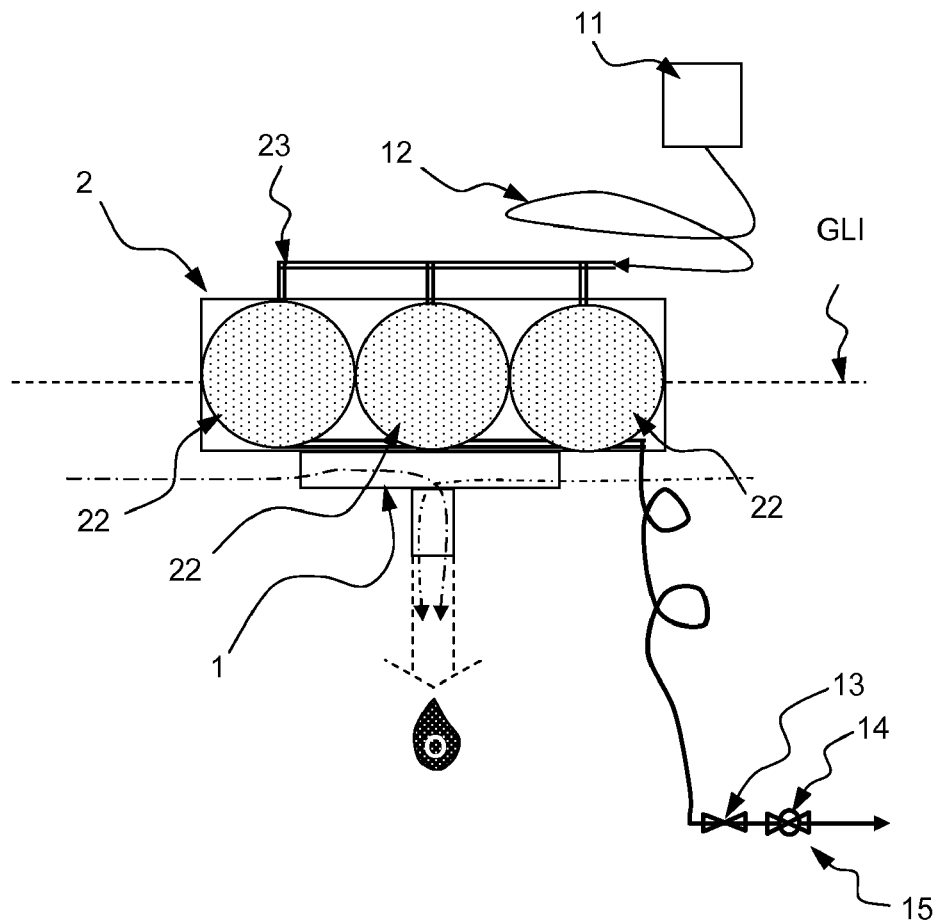
Figure 4

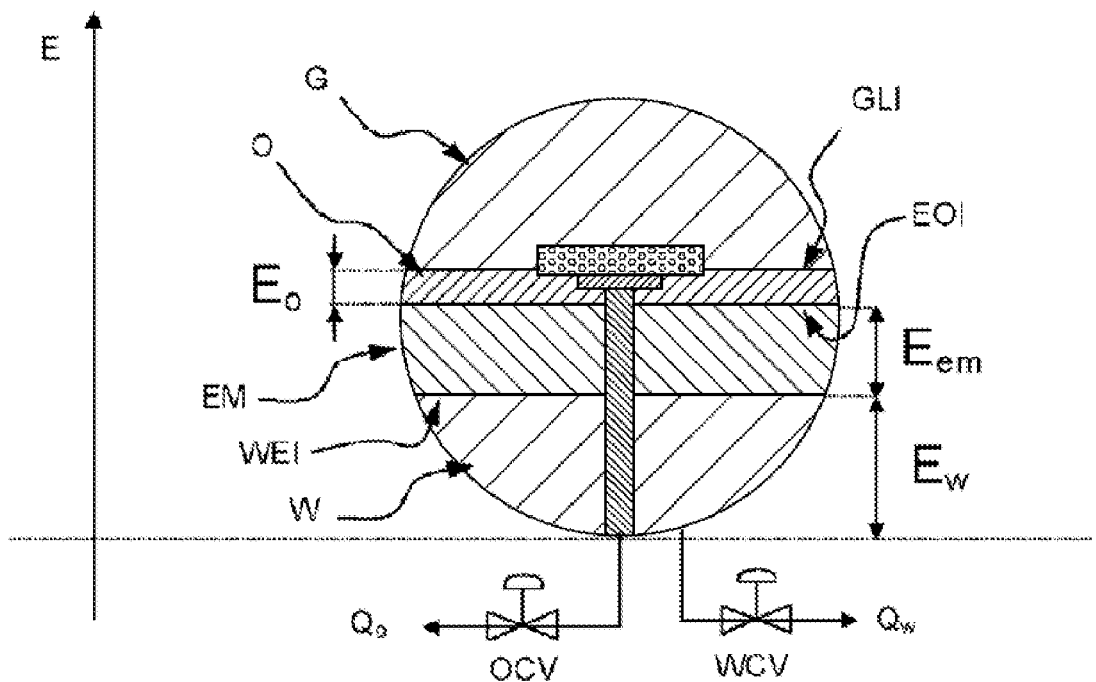
Figure 5.A
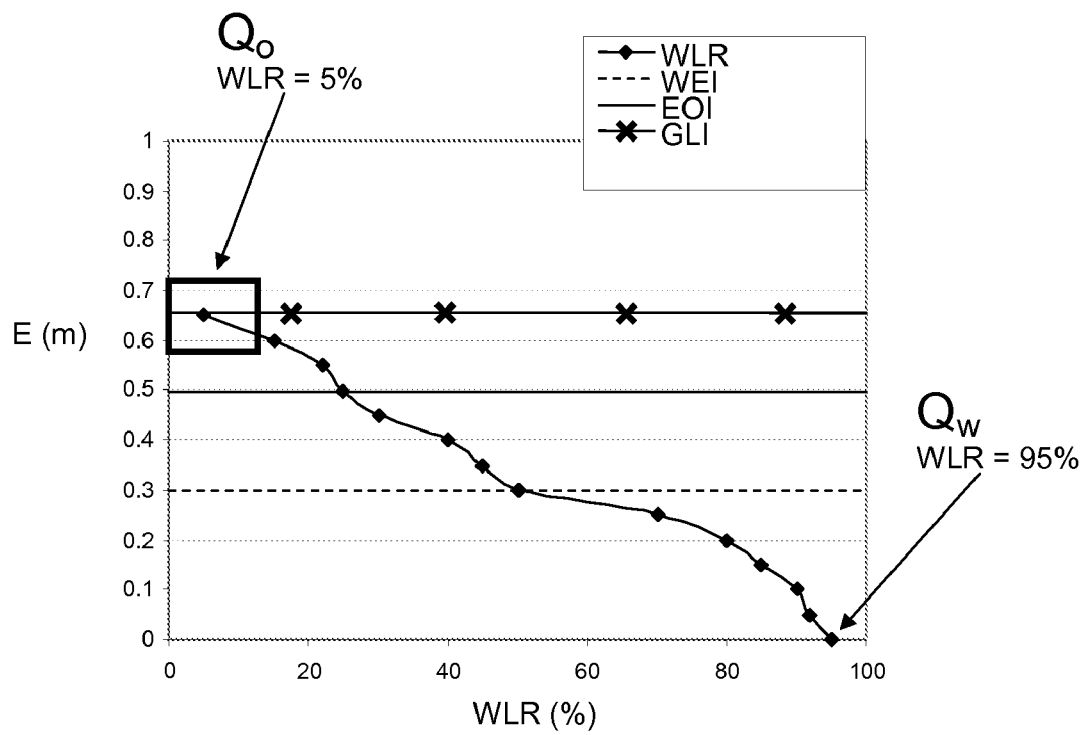
Figure 5.B

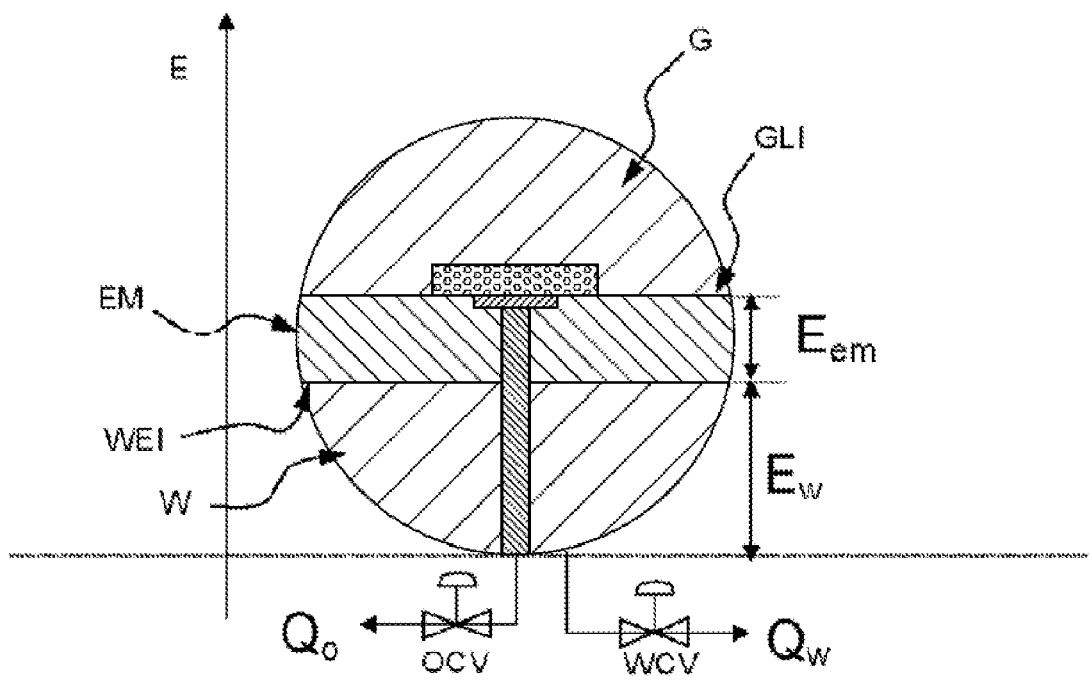
Figure 6.A
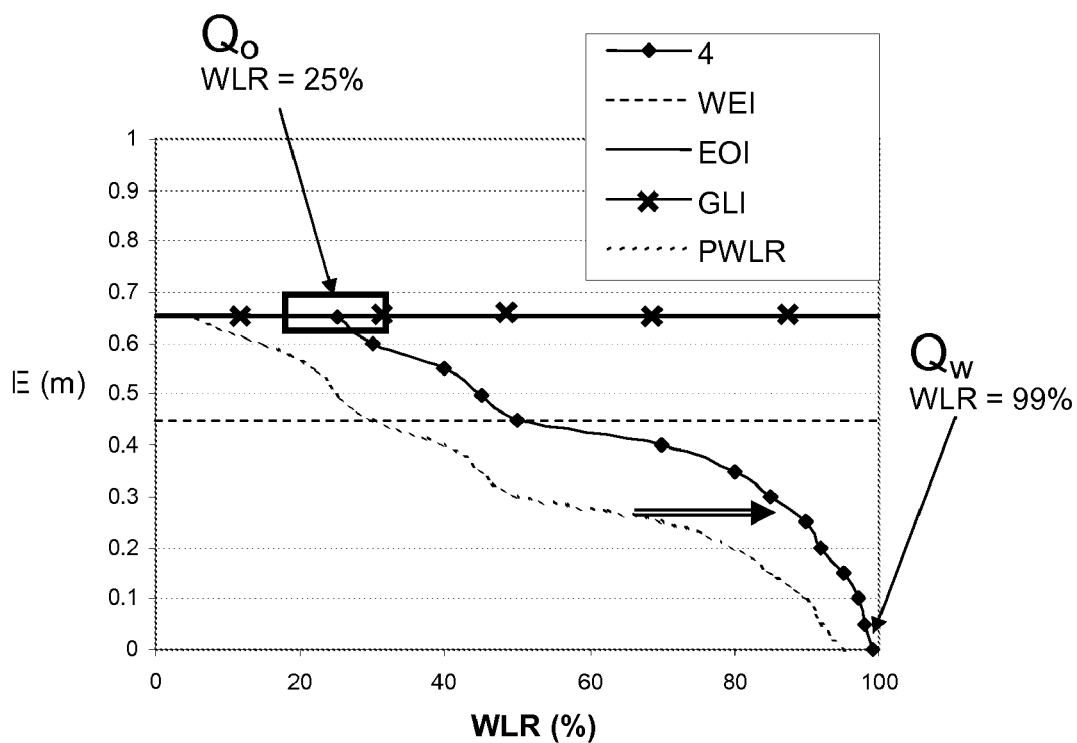
Figure 6.B

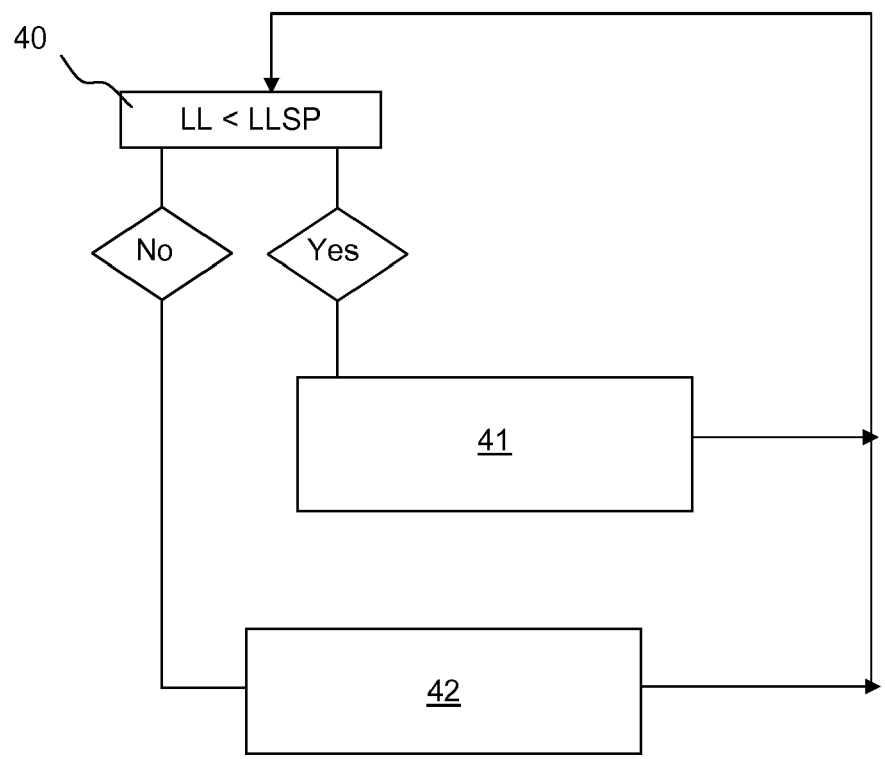
Figure 10.A
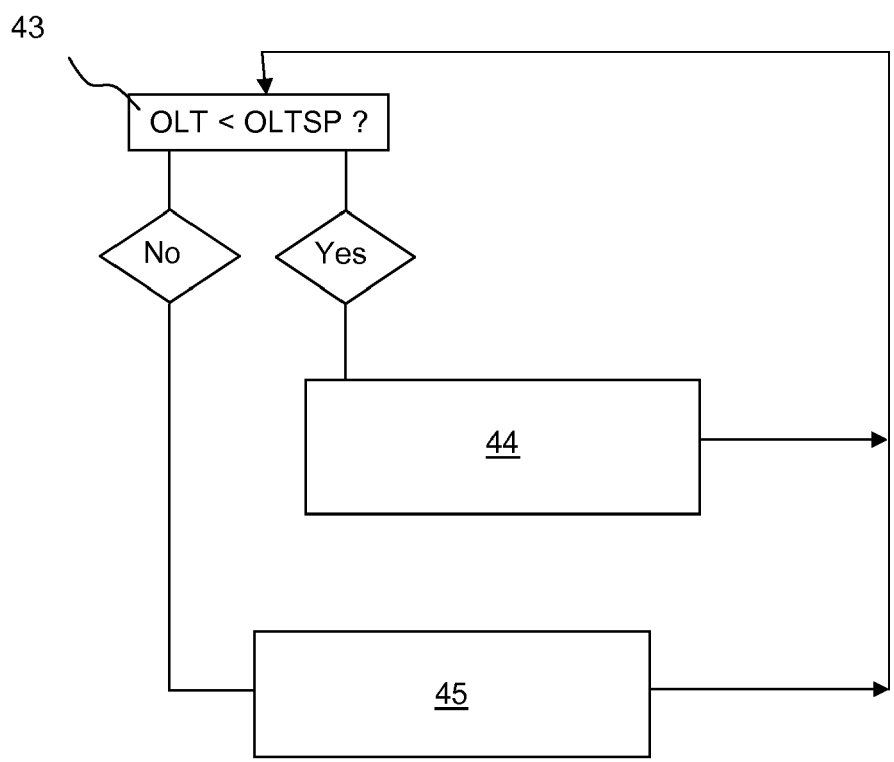
Figure 10.B

GRAVITY SEPARATOR FOR A MULTI-PHASE EFFLUENT

CROSS-REFERENCE TO RELATED APPLICATIONS

This application is related to and claims the benefit as a divisional from U.S. application Ser. No. 11/568,250, filed on Oct. 24, 2006, now U.S. Pat. No. 7,654,397; which is related to and claims the benefit of International Application No. PCT/EP2005/004642, filed on Apr. 29, 2005; which is related to and claims the benefit of European Application No. 04291179.2, filed on May 6, 2004; the entire contents of each are hereby incorporated by reference.

FIELD OF THE INVENTION

The invention relates to a gravity separator for separating different phases of a multiphase effluent.

A particular application of the invention relates to a separator for an effluent from a hydrocarbon well. Such an effluent typically comprises three phases: an aqueous phase, a liquid hydrocarbon phase and a gaseous hydrocarbon phase.

BACKGROUND OF THE INVENTION

After a hydrocarbon well has been drilled and made safe, a well testing operation is generally carried out for a short period of time. The well testing operation serves to characterize the various components of the well, and to estimate the production capacities of the well. An aspect of the test is to separate certain phases of the effluent, typically water, oil, and gas. Since the various phases are of different densities, separation takes place continuously in a gravity separator, in which the phases settle out. The gravity separator can be a vertical or a horizontal separator.

FIG. 1 shows a hydrocarbon well OW and a well testing arrangement. An effluent E flows out of the well from a well head WH. The well head WH is connected to a well testing arrangement. The well testing arrangement typically comprises a chain of elements connected together, namely a pressure reducer PR, a heat exchanger HE and a separator S. The hydrocarbons that have been separated are burnt off: oil is burnt in an oil burner OD and gas is flared in a gas flare GD. The separated aqueous phase is discharged WD, optionally after undergoing additional purification.

At the beginning of the well testing operation—the clean-up period—the composition of the effluent varies considerably. The well is initially filled with aqueous residues from the well construction operation such as drilling fluid and completion fluid. The effluent that is initially collected is essentially made up of water. During the clean up period, the percentage of aqueous residue decreases gradually, and the composition of the effluent becomes enriched with oil and with gas.

A separator can be sized such as to treat an effluent whose phase fractions remain substantially stable over time. Such a separator is not well adapted to handle an effluent with substantially varying phase fractions as encountered at the beginning of the clean-up period. A first solution consists in sending the effluent directly to the burner. This solution results in un-burnt hydrocarbons and an environmental pollution problem. A second solution consists in storing effluent in containers, waiting long enough for gravity separation and subsequent disposal of the different phase. A third solution consists in building an effluent treatment installation near the well. The last two solutions result in costly and voluminous equipment.

WO 0183073 describes a separator comprising an adjustment arrangement for adjusting the geometrical separation characteristics of the separator in dependence on the different phase fractions in the effluent.

A first exemplary embodiment of the adjustment arrangement consists in a weir plate assembly of variable height, e.g. under the form of telescopic plates.

A second exemplary embodiment of the adjustment arrangement consists in a duct assembly of variable height, e.g. under the form of telescopic tube or bellows comprising a recovery duct terminated by a suction intake.

Both embodiments are actuated by a mechanical actuator (pneumatic, hydraulic, electrical or lever arm).

This arrangement combined with a regulation of the flow-rate of the different phases flowing in and out of the separator enable an efficient and pollution free treatment of variable phase ratio effluent.

SUMMARY OF THE INVENTION

One of the objects of the present invention is to provide a gravity separator that is easier to adjust than the prior art separator.

According to the invention, a gravity separator for separating a liquid phase and a gas phase from an effluent made of a multiphase fluid mixture comprises a collector which is self-positioning in the phase to be collected regardless of the different phases ratio in the effluent; and a gas outlet to extract the gas phase.

More precisely, the present invention relates to a gravity separator for separating a liquid and a gas phase from a multiphase fluid mixture. The gravity separator comprises a collector for collecting the liquid phase, a gas outlet for extracting the gas phase and a draining circuit coupled to the collector for draining the liquid phase out of the separator. The gravity separator further comprises a floating assembly coupled to the collector. The floating assembly is arranged to float at an interface between the liquid phase and the gas phase so that the collector is positioned in the multiphase fluid mixture present in the gravity separator for collecting substantially the liquid phase.

The floating assembly may comprise a floater and a pressure equalization arrangement for equalizing the pressure inside the floater with the pressure inside the separator. It may also comprise a bleed off circuit to drain off any liquid entering accidentally into the floater.

The draining circuit may comprise an articulated assembly or a flexible assembly for maintaining the collector in a horizontal position and allowing a free vertical positioning of the collector in the separator.

The invention is adapted for an application to the oilfield service industry. In particular, the separator of the invention can treat a hydrocarbon fluid mixture from a hydrocarbon well. Such a mixture typically comprises three phases: an aqueous phase (water phase—in fact a water-enriched phase), a liquid hydrocarbon phase (oil phase—in fact an oil-enriched phase) and a gaseous hydrocarbon phase (gas phase). In this application, the phase to be collected by the collector of the gravity separator according to the invention is the oil phase.

In the separator, the hydrocarbon fluid mixture separates by gravity into a liquid layer and a gas layer. The liquid layer is constituted by a water-enriched layer (water with impurity, namely oil) and an oil-enriched layer (oil with impurity, namely water). The liquid layer further comprises an emulsion layer between the water-enriched layer and the oil-enriched layer. The thickness of the emulsion layer depends on the relative physical and chemical properties (e.g. density, interfacial tension, etc. . . . ) of the oil and water phases.

The invention also relates to a hydrocarbon well testing arrangement, for testing a hydrocarbon well that produces a multiphase fluid mixture. The arrangement comprises a gravity separator according to the invention for separating a liquid hydrocarbon phase from the multiphase fluid mixture.

Further, the invention relates to a method for separating a hydrocarbon multiphase fluid mixture.

During an application step, the hydrocarbon fluid mixture is applied to the separator that separates by gravity the hydrocarbon fluid mixture into a liquid layer and a gas layer.

The liquid layer is constituted by a water-enriched layer and an oil-enriched layer. The liquid layer is separated from the gas layer by a gas/liquid interface having a liquid level in the separator.

During an extraction step, the oil-enriched liquid is extracted from the oil-enriched layer at an oil flow rate, and the water-enriched liquid is extracted from the water-enriched layer at a water flow rate.

During a liquid-level measurement step, the liquid level is measured.

During a level-based adjustment step, one of the flow rates is adjusted so that the liquid level is maintained at a pre-set liquid level value.

During a parameter measurement step, a parameter representative of an impurity ratio present in one of the extracted liquids is measured.

During a parameter-based adjustment step, the other flow rate is adjusted so that the parameter representative of an impurity ratio is maintained at a pre-set parameter value.

The parameter representative of the impurity ratio may be a water/liquid ratio value in the extracted oil-enriched liquid, a water/liquid ratio value in the extracted water-enriched liquid, a water/liquid ratio value at a determined location in the separator, a height of a water/emulsion interface level, a height of an emulsion/oil level, or a thickness of the oil-enriched layer.

Consequently, the gravity separator of the invention does not require any mechanical actuator to position the collector in the phase. Further, the gravity separator according to the invention is simple, auto-adjustable and easy to adjust and maintain.

BRIEF DESCRIPTION OF THE DRAWINGS

The present invention is illustrated by way of example and not limited to the accompanying figures, in which like references indicate similar elements:

FIGS. 3.A and 3.B are schematic cross-section views of an adjustable collecting assembly according to the first embodiment of the invention for a high liquid height in the vessel and for a low liquid height in the vessel respectively;

FIG. 4 is a schematic cross-section detailed view of the collector and floater assembly according to a first alternative of the first embodiment of the invention;

FIGS. 5.A and 5.B schematically illustrate the water/liquid ratio profile (WLR) distribution versus elevation E at the end of the separator in a first case corresponding to a water/emulsion interface set low;

FIGS. 6.A and 6.B schematically illustrate the water/liquid ratio profile (WLR) distribution versus elevation E at the end of the separator in a second case corresponding to a water/emulsion interface set high;

FIGS. 9, 10.A and 10.B schematically illustrate a second regulation principle of the multi-phase effluent separation process of the invention.

DETAILED DESCRIPTION OF THE INVENTION

Figure 1:
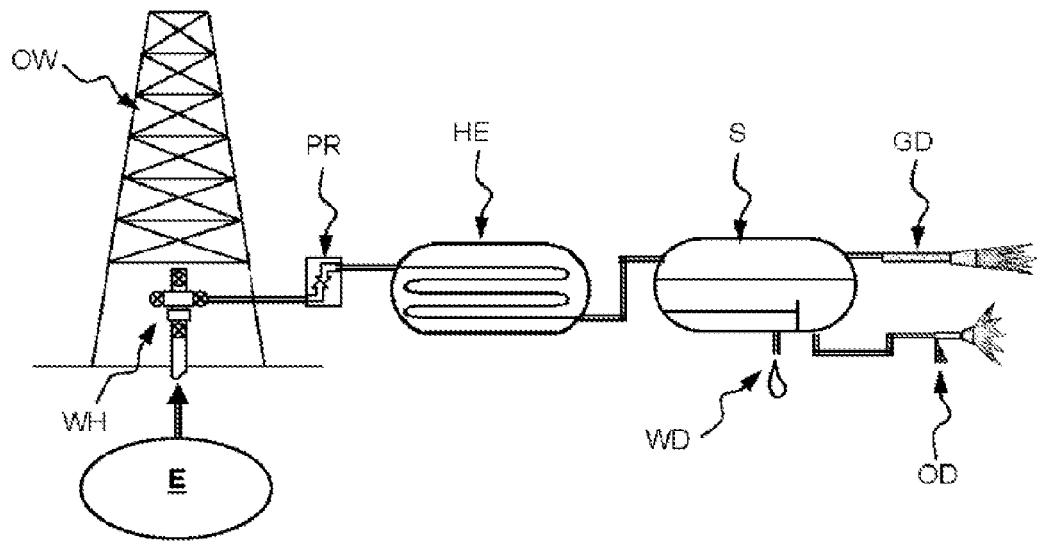
FIG. 1 is a schematic view of an hydrocarbon well and a well testing arrangement according to the prior art.
Figure 2:
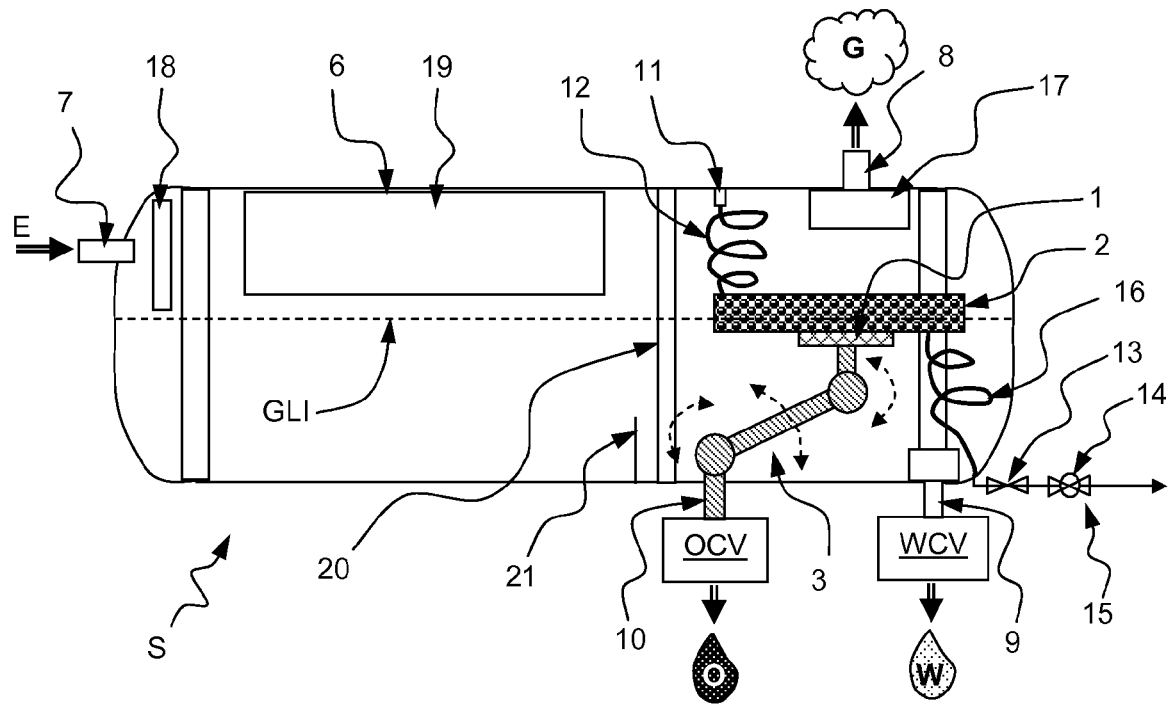
FIG. 2 is a schematic cross-section view in gravity separator according to a first embodiment of the invention.

FIG. 2 shows a schematic cross-section view of a separator according to a preferred embodiment of the invention. This embodiment relates to an articulated adjustable collecting assembly.

An effluent E to be treated penetrates into the separator S through an effluent inlet 7.

The effluent E is for example a multiphase fluid mixture provided by a hydrocarbon well after having passed a solids separator, a pressure reducer and a heat exchanger.

The separator S usually comprises a vessel 6 under the form of a cylindrical tank of approximately 4 $m^3$ capacity. The vessel size is a compromise between effluent capacity and transportability: the separator is advantageously transportable from one hydrocarbon well site to another. The separator operates according to the well known principle of the different phases of the effluent settling out by gravity.

In the particular application of the separator to the oil industry, the separator is a three-phase separator that separates the multiphase effluent into single-phase streams of oil O, gas G and water W.

After the effluent E has flown into the vessel, the multiphase mixture meets an impacting plate 18 placed just in front of the inlet 7. The impacting plate 18 enables large liquid droplets to generate, and fall down by gravity in the vessel. Additionally, the separator comprises coalescing plates 19 made of e.g. several horizontal plates assembled as a packing. The coalescing plates 19 intercept the medium sized liquid droplets carried over with the gas and form a liquid film flowing along the plates to the bottom of the separator (coalescence effect). The impacting 18 and coalescing 19 plates enable better gas/liquid separation efficiency but can be omitted.

After separation, the gas G leaves the vessel 6 through a gas outlet 8 before being burnt off in a flare (not shown), the oil-enriched liquid O leaves the vessel 6 through oil outlet 10 before going to an oil burner or a storage tank (not shown), and the water-enriched liquid W leaves the vessel 6 through water outlet 9 before being rejected or optionally going through a water treatment system (not shown). The gas outlet 8 can be provided with a mist extractor 17 that removes the fine liquid droplets from the gas. The mist extractor 17 is for example under the form of a fine mesh pad acting as a coalescer. Additionally, the separator can be fitted with an anti-foam wall 20 and a solids weir 21 for a better water, oil and water/oil emulsion quality.

For a given flow rate of the effluent E penetrating the vessel 6, the quantity of water and the quantity of oil in the vessel 6 can vary in dependence on different parameters, in particular the flow of water-enriched liquid and the flow of oil-enriched liquid leaving the vessel.

The flow of water and oil can be adjusted via the water control valve WCV and the oil control valve OCV respectively. The adjustment consists in acting on the corresponding control valves so as to obtain a compromise regarding the quantity of impurities, namely water in oil at the water outlet 9 and oil in water at the oil outlet 10.

Further, the gas G and the liquid (water W and oil O) define a gas/liquid interface GLI, which level (called the liquid level) varies in dependence on these parameters.

Firstly, an adjustable collecting assembly which can accommodate the above mentioned variation of the liquid level will be described.

Secondly, the description will focus on the regulation process.

An adjustable collecting assembly for a separator according to the preferred embodiment of the invention comprises an oil collector 1, a floating assembly 2 and an oil circuit 3.

FIG. 3.A illustrates the adjustable collecting assembly when the liquid level GLI is set at a high level (e.g. 65% of the vessel height). FIG. 3.B illustrates the adjustable collecting assembly when the liquid level set at a low level (e.g. 25% of the vessel height).

The articulated oil circuit 3 connects the oil collector 1 to the oil outlet 10 at the bottom of the vessel 6. The oil circuit 3 is made of a rigid pipe 5 and swivels 4 assembly. A first swivel connects the rigid pipe 5 to the oil collector 1 and a second swivel connects the rigid pipe 5 to the oil outlet 10.

The oil collector 1 is coupled to a floater 2. According to this embodiment, the collector is fastened below the floating assembly. The floating assembly 2 floats at the gas/liquid interface GLI. Thanks to the floater 2, the oil collector is always maintained just below the gas/liquid interface GLI whatever its level in the vessel. The oil collector 1 collects the oil-enriched liquid from a thin layer positioned at the same elevation as the collector.

The articulated oil circuit 3 made of rigid pipe and swivels, enables a free vertical collector 3 positioning in the vessel and enables the collector to keep up a horizontal position. The oil drained from the thin layer, flows through the articulated oil circuit 3 to the oil outlet 10 at the bottom of the vessel.

Obviously, any other articulated oil circuit ensuring the same positioning of the collector could be used, for example a telescopic piping.

According to another embodiment of the invention (not shown) the articulated oil circuit is replaced by a flexible oil circuit ensuring the same kinematic movement of the oil collector. The flexible oil circuit could be for example a flexible hose or flexible bellow.

Advantageously, the floating assembly 2 is compact to avoid geometric interferences with the vessel. Also, the floating assembly is sized to support the weight of the collector 1 and the attached articulated liquid circuit 3.

Advantageously, the floating assembly is as light as possible and has a mechanical resistance so as to avoid collapsing or bursting whatever the separator pressure is (typically 0 to 100 barg).

FIG. 4 is a detailed view of the floating assembly. The floating assembly 2 is made of several floats 22 attached together. The floats may be cylindrical in shape so as to provide the best mechanical resistance and the shortest draught. However, other shapes are possible, e.g. parallelepipedic or complex shapes made of combination of parallelepipedic and cylindrical shape, etc. . . .

The cylinders may be manufactured in plastic materials. Alternatively, the cylinder may be shaped from thin stainless-steel sheets. Advantageously, the cylinders are hollow.

Alternatively, other kinds of floating assemblies showing similar characteristics can be used, for example a floater made of molded plastic or molded by foam injection, etc. . . . Additionally, a first flexible liner 12 (typically ½ inch diameter) may be connected to the floaters 22. The flexible liner 12 should be long enough to allow vertical translation of the collector 1. For example, the flexible liner 12 is enrolled in a spiral shape. The first flexible liner 12 enables the pressure equalization between the internal pressure of the vessel 6 and the internal pressure of the cylinders 22. A pressure port 11 is secured preferably at the top of the vessel 6, where there is never any liquid. The first flexible liner 12 can be made of for example plastic.

A second flexible liner 16 (½ inch diameter) may also be connected to the floaters 22. The second flexible liner 16 can be made for example of plastic. The second flexible liner 16 is a bleed off circuit, enabling to drain liquid out of the floats 22 in case liquid enters accidentally in the floats. The second flexible liner 16 is connected to a drain line assembly 15 comprising a needle valve 13 and ball valve 14. The drain line assembly 13, 14, 15 enables to drain liquid from the floater assembly 2 even when the separator is under pressure and/or running.

Consequently, whatever the embodiment, the collector is self-positioning in the oil layer and no actuator is necessary.

The regulation process will be described in detail here below.

The liquid level is regulated and can be set between the low level (typically 25% of the vessel height) and the high level (typically 65% of the vessel height) by acting on the flow of oil O (in fact oil-enriched liquid) and water W (in fact water-enriched liquid) leaving the separator.

The flow of liquid at the oil outlet 10 (oil flow rate $Q_O$) and at the water outlet 9 (water flow rate $Q_W$) is controlled by outlet control valves OCV and WCV respectively. The control valve OCV at the oil outlet 10 regulates the global liquid level to the desired level (set somewhere between the low and high liquid level). The control valve WCV at the water outlet 9 regulates the water/emulsion interface WEI level. For a constant liquid level, the higher the water flow-rate $Q_W$ leaving the separator is, the lower the interface level will be. Conversely, a water flow rate reduction will tend to raise the interface level.

FIGS. 5.A and 6.A show the distribution of the different interfaces versus elevation E in the separator vessel at the end of the separator (near the collector). During the gravity separation process, the various phases of the effluent settle out. A fluid stratification occurs in the vessel, with the water W below, oil O in the middle and gas G on top. Between water and oil, there is no discontinuity but an emulsion layer EM making a smooth transition between water and oil. In a vertical upward axis E, there is a water/liquid ratio WLR profile of 100% at the bottom of the vessel and 0% at the gas/liquid interface GLI (supposing an ideal oil/water separation). If the separation process is partially done, the water/liquid ratio WLR profile will decrease (from the bottom of the vessel) from a given value to a lower value at the gas/liquid interface GLI. In this case, the water/liquid ratio WLR profile is smooth and continuous. In these Figures, the thickness of:

the oil layer $E_O$ is a function of the retention time $T_{res}$ and the flow rate of the liquid flowing into the vessel $Q_{liq\_in}$, the emulsion layer $E_{em}$ is a function of the retention time $T_{res}$, the flow rate of the liquid flowing into the vessel $Q_{liq\_in}$, and the water/liquid ratio of the liquid in the effluent flowing into the vessel $WLR_{in}$), and the water layer $E_W$ is a function of the retention time $T_{res}$ and the flow rate of the water flowing out of the vessel $Q_{W\_out}$.

FIGS. 5.B and 6.B show the water/liquid ratio WLR (represented by a diamond-line) versus the elevation E in the separator vessel at the end of the separator (near the collector). In these Figures, the water/emulsion interface WEI (represented by a broken-line), emulsion/oil interface EOI (represented by a full-line) and the gas/liquid interface (represented by a cross-line) are also shown. FIG. 6.B further shows the water/liquid ratio of FIG. 5.B PWLR (represented by a doted-line) for illustrating the profile shifting.

In FIG. 5.B the rectangle shows a particular point on the water/liquid ratio profile corresponding to water/liquid ratio at the oil collector of 5%, while the arrow shows a particular point corresponding to water/liquid ratio at the water outlet of 95%.

In FIG. 6.B the rectangle shows a particular point on the water/liquid ratio profile corresponding to water/liquid ratio at the oil collector of 25%, while the arrow shows a particular point corresponding to water/liquid ratio at the water outlet of 99%.

According to an approximation consisting in neglecting the vessel geometry, and for the following given parameters:
the liquid retention time $T_{res}$,
the liquid (oil and water) flow rates $Q_{liq\_in}$ flowing into the separator,
the oil O and water W characteristics, and
identical pressure and temperature conditions, the emulsion layer thickness $E_{em}$ is constant whatever the water/emulsion interface WEI level is.

FIGS. 5.A and 5.B illustrate a case characterized in that the oil OCV and water WCV control valves regulate the flow leaving the vessel such that the water/emulsion interface WEI, the emulsion/oil interface EOI and gas/liquid interface GLI stay at a given elevation (first case corresponding to a water/emulsion interface WEI set low). In this condition, reducing the water flow rate leaving the separator will raise the water/emulsion interface WEI and increase the oil flow-rate while maintaining a constant liquid level.

FIGS. 6.A and 6.B illustrate a case characterized in that the water/liquid ratio WLR profile stay the same (because the residence time and fluids are the same) but shifts on the right (illustrated by the arrow in FIG. 6.B) in an elevation versus WLR graph. This new WLR graph relates to a case corresponding to a water/emulsion interface WEI set high. The water/liquid ratio WLR at the water outlet will be higher (shifting from 95% to 99%) and the water/liquid ratio WLR at the oil outlet will be higher as well (shifting from 5% to 25%).

Consequently, the higher the water/liquid ratio WLR is at the oil outlet, the higher the water/liquid ratio WLR, and conversely, the lower the oil-in-water is at the water outlet.

FIGS. 7, 8 and 9, 10 respectively illustrate a first and a second example of the regulation principle of the multi-phase effluent separation process of the invention.

According to a first example, in order to
raise the water/emulsion interface level as much as possible,
keep up the water/liquid ratio WLR at the oil outlet, namely low water content in the oil, and
extract water at the maximum water/liquid ratio WLR at the water outlet, namely water with a minimum oil content, the flow at the water outlet is regulated with the help of a water-cut analyzer placed at the oil outlet. The water-cut analyzer measures the quantity of impurity, namely water content in the oil-enriched liquid flowing out the outlet. The water-cut analyzer can be any measurement apparatus that measures a characteristic value of the impurity present in the oil-enriched liquid (e.g. analyzer measuring the dielectric constant of the oil-enriched liquid based on ultrasonic measurement, or analyzer measuring the calorific capacity of the oil-enriched liquid, etc. . . . ).

Further, to manage the limit cases, like poor separation case or water/emulsion interface level too high or too low, the water control valve is regulated not only on the water/liquid ratio WLR at the oil outlet but on a combination of the water/liquid ratio WLR and the water/emulsion interface level.

Figure 7:
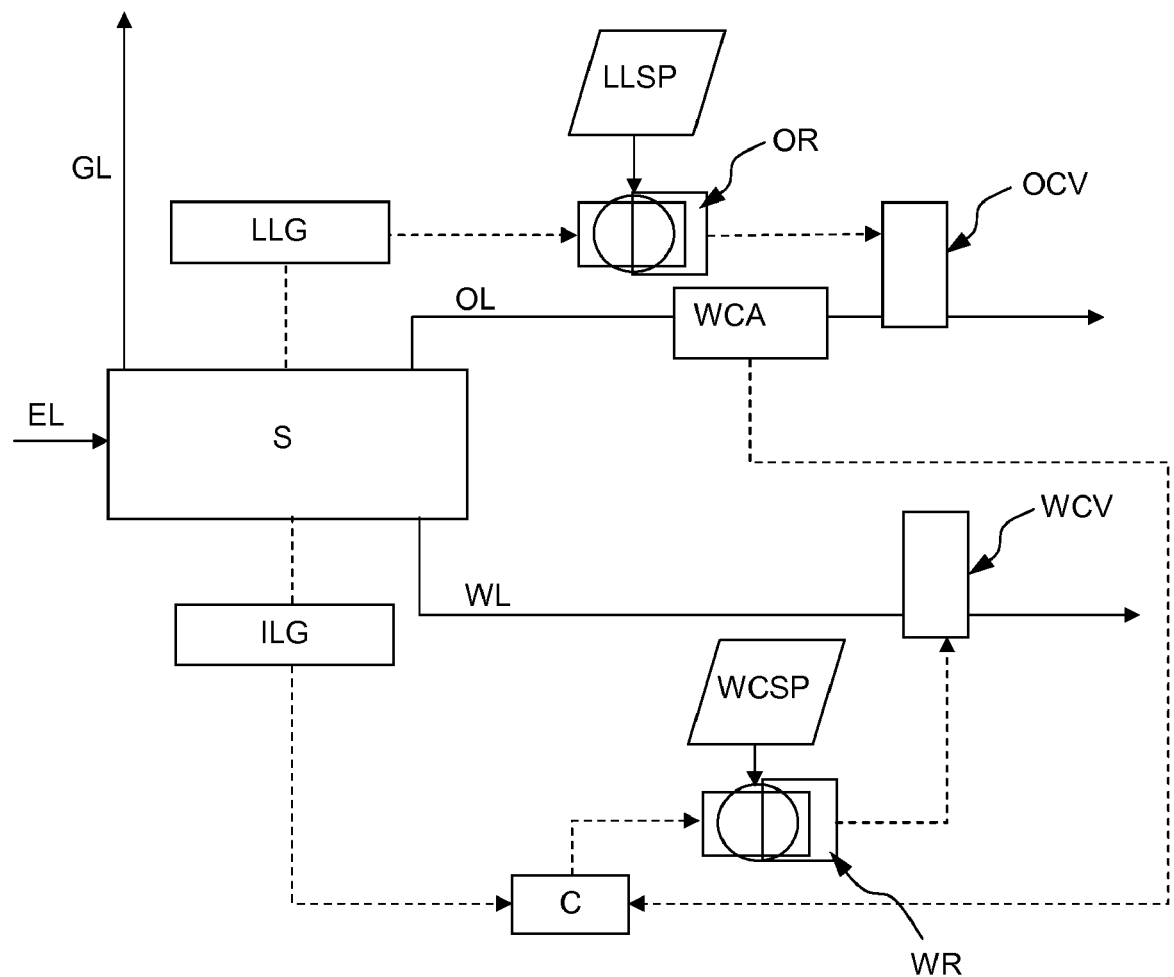
FIGS. 7 and 8 schematically illustrate a first regulation principle of the multi-phase effluent separation process of the invention.

FIG. 7 shows schematically a separator S with an effluent line EL upstream of the separator and gas GL, oil OL and water WL lines downstream of the separator and the regulation system.

An in-line water-cut analyzer WCA is placed in the oil outlet outside of the separator vessel. A liquid level gauge LLG is placed in the vessel and transmits the liquid level to an oil regulator OR. The oil regulator OR regulates the opening of the oil control valve OCV of the oil line OL. The oil regulator acts on the valve according to predetermined data corresponding to a liquid level set point LLSP (for example 55% of the vessel height).

A water/emulsion interface level gauge ILG, placed in the vessel, transmits the interface level to a controller C. The controller also receives information from the in-line water-cut analyzer WCA. The controller C controls the flow going out of the separator via the water regulator WR. The water regulator WR regulates the opening of the water control valve WCV of the water line WL. Initially, the water regulator WR is fed with predetermined data corresponding to a water cut set point WCSP.

By increasing or reducing the opening of the water control valve WCV, it is possible to change the height of the water/emulsion interface downward or upward respectively. For a given global residence or retention time, the emulsion layer remains constant, and the emulsion/oil interface shifts like the water/emulsion interface. Thus, it is possible to optimize the water quality (oil in water content) at the water outlet by controlling the water control valve WCV so that oil and water flow through the oil outlet at a pre-set water-cut value. The pre-set water-cut value is a predetermined admissible value of the impurity, i.e. water, present in the oil-enriched liquid flowing out of the separator.

Figure 8:
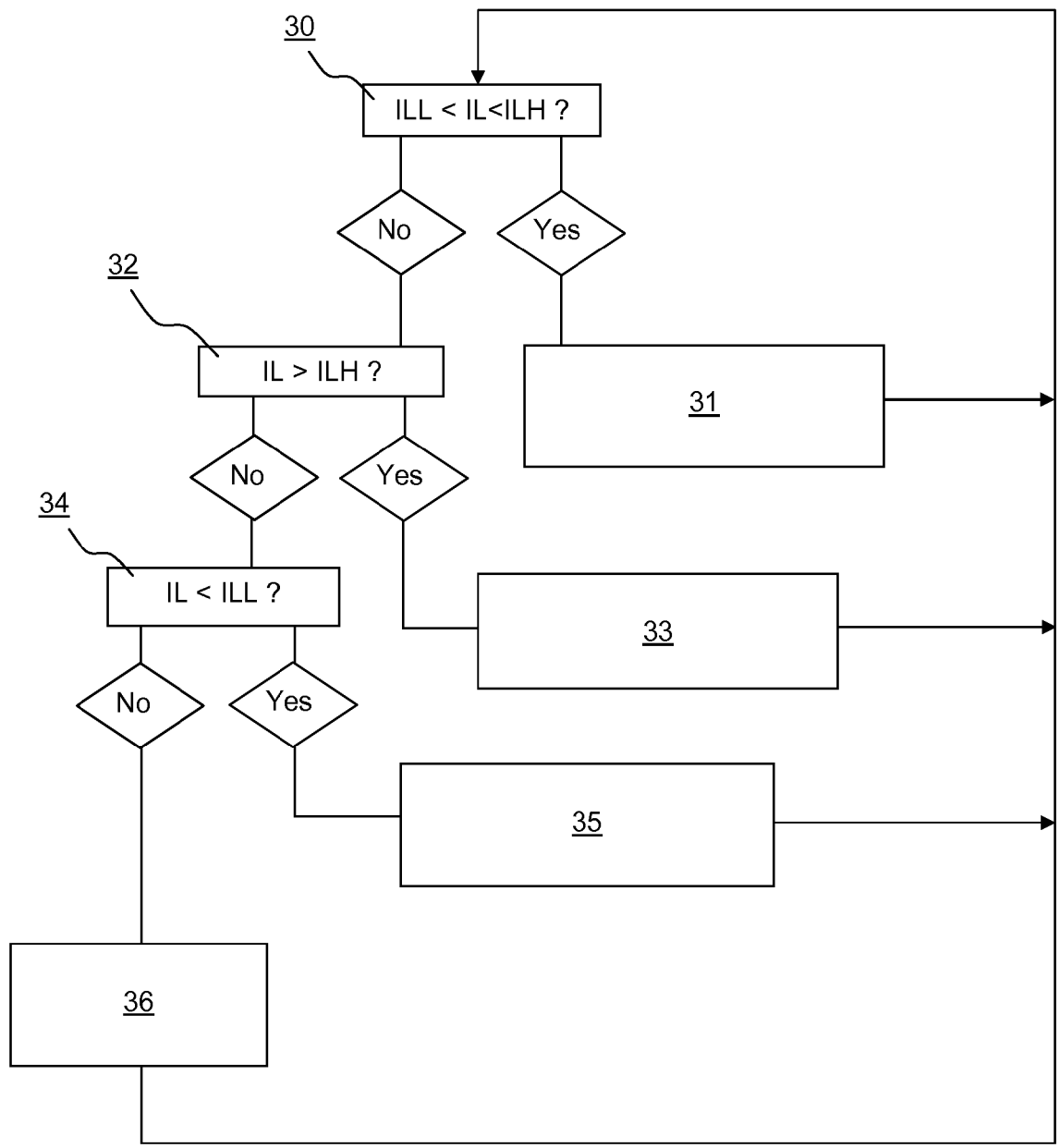

FIG. 8 illustrates the logic controlling the separator regulation. The controller C receives the water/emulsion interface level measurement IL, and determines in a step 30 whether this measurement ranges between a low interface level value ILL and a high interface level value ILH. At the same time, the controller C also receives the water cut value from the water-cut analyzer WCA at the oil outlet.

When the measurement is in the range, the controller C makes the water regulator WR regulate the water control valve WCV on the pre-set water-cut value (step 31).

When the measurement is out of the range, the controller C determines in a step 32 whether the IL measurement is higher than the high interface level value ILH. If the measurement is higher, the water/emulsion interface level is too high and the controller C makes the water regulator WR to open the water control valve WCV until the IL measurement becomes inferior to the high interface level value ILH (step 33).

If the measurement is not higher than the high interface level value ILH, the controller C determines in a step 34 whether the IL measurement is lower than the low interface level value ILL. If the measurement is lower, the water/emulsion interface level is too low and the controller makes the water regulator WR to close the water control valve WCV until the IL measurement becomes higher than the low interface level value ILL (step 35).

Finally, when the IL measurement is not lower than the low interface level value ILL, it means that the water/emulsion interface does not exist and that the oil/water separation does not occur. The controller makes the water regulator WR to close the water control valve WCV (step 36).

Alternatively, according to the second example, the separator can be controlled to:
- obtain a pre-set liquid level LLSP by acting on the water control valve WCV, and
- to obtain a pre-set oil layer thickness OLTSP by acting on the oil control valve OCV.

Figure 9:
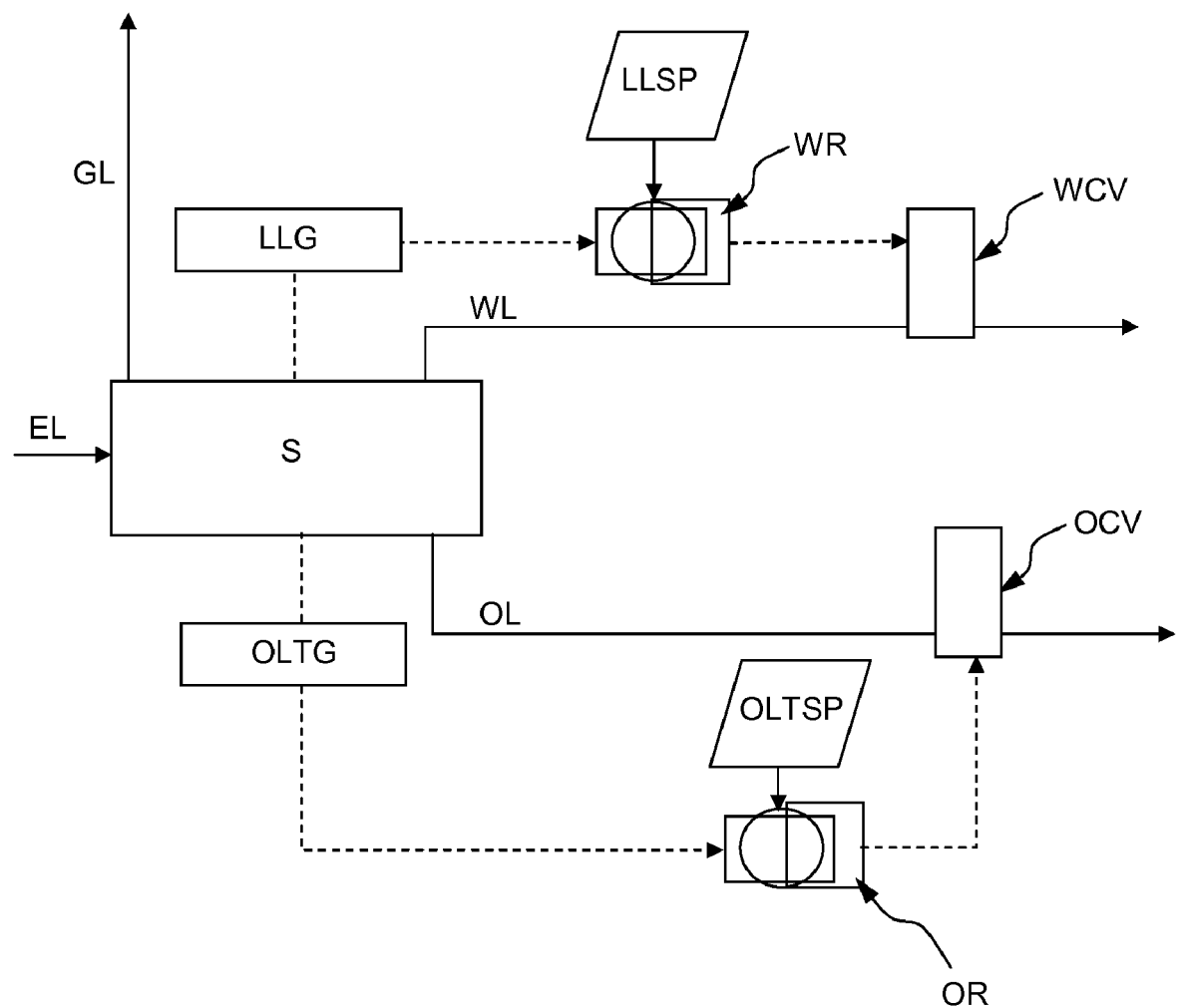

FIG. 9 shows schematically a separator S with an effluent line EL upstream of the separator and gas GL, oil OL and water WL lines downstream of the separator and the regulation system.

A liquid level gauge LLG is placed in the vessel and transmits the liquid level to a water regulator WR. The water regulator WR regulates the opening of the water control valve WCV of the water line WL. The water regulator acts on the valve according to predetermined data corresponding to a liquid level set point LLSP (for example 55% of the vessel height).

An oil layer thickness gauge OLTG, placed in the vessel, transmits the oil layer thickness OLT to an oil regulator OR. The oil regulator OR regulates the opening of the oil control valve OCV according to predetermined data corresponding to an oil layer thickness set point OLTSP.

FIGS. 10.A and 10.B illustrate the logic controlling the separator regulation. In a step 40, the liquid level LL is compared to the pre-set value LLSP. If the total liquid level LL is lower than liquid level set point LLSP, the water control valve is opened (step 41). If the total liquid level is higher than the set point, the water control valve is closed (step 42). In the same time, in a step 43, the oil layer thickness OLT is compared to the pre-set value OLTSP. If the oil layer thickness OLT is lower than the pre-set oil layer thickness OLTSP, the oil control valve is closed (step 44). Conversely, if the total liquid level is lower than the set point, the water control valve is opened (step 45).

The oil and water flow rates are interdependent, i.e. a change in the oil layer thickness will also result in a change of the total liquid level. The second example of the regulation principle is particularly advantageous because it does not require any water-cut analyzer which is a costly measurement apparatus. Also, with the water-cut analyzer less regulation system, it is possible to regulate a separator whatever the effluent characteristic, e.g. typically for an effluent containing a gas and a water phase and not any oil phase.

In the first and a second example of the regulation principle described hereinbefore, the gauges (liquid level gauge and layer thickness gauge) can be any measurement apparatus that measures a level of a liquid or calculate a thickness of a liquid layer present in the separator measurement (e.g. a radar gauge, magnetic floater, or differential pressure sensors, etc. . . . combined with an adapted electronic circuit).

The description hereinbefore illustrates the following method for separating a hydrocarbon multiphase fluid mixture.

During an application step, the hydrocarbon fluid mixture is applied to the separator that separates by gravity the hydrocarbon fluid mixture into a liquid layer and a gas layer.

The liquid layer is constituted by a water-enriched layer and an oil-enriched layer. The liquid layer is separated from the gas layer by a gas/liquid interface having a liquid level in the separator.

During an extraction step, the oil-enriched liquid is extracted from the oil-enriched layer at an oil flow rate, and the water-enriched liquid is extracted from the water-enriched layer at a water flow rate.

During a liquid-level measurement step, the liquid level is measured.

During a level-based adjustment step, one of the flow rates is adjusted so that the liquid level is maintained at a pre-set liquid level value.

During a parameter measurement step, a parameter representative of an impurity ratio present in one of the extracted liquids is measured.

During a parameter-based adjustment step, the other flow rate is adjusted so that the parameter representative of an impurity ratio is maintained at a pre-set parameter value.

In the description hereinbefore, the parameter representative of the impurity ratio was:
- in the first example, the water/liquid ratio value in the extracted oil-enriched liquid, and
- in the second example, a thickness of the oil-enriched layer.

However, it will be evident that there are numerous alternatives, which fall within the scope of the appended claims. In this respect, the following closing remarks are made.

Other parameters representative of the impurity ratio can be used for regulating the separation, namely the water/liquid ratio value in the extracted water-enriched liquid, the water/liquid ratio value at a determined location in the separator (a location in the liquid layer where a value of WLR is measurable—see FIG. 5B or 6B), the height of the water/emulsion interface level, or the height of the emulsion/oil level.

In the description made here above, the water liquid ratio WLR has been used to characterize the quantity of water in the liquid. However, it will be evident that one ordinary skilled in the art could have alternatively used the oil liquid ratio OLR characterizing the quantity of oil in the liquid. The WLR and OLR ratio are the complementary of each other.

A particular application of the invention relating to a separator for an effluent typically comprises three phases flowing from a hydrocarbon well has been described. However, the invention is also applicable for the separation of other kind of multiphase fluid mixture, for example milk.

The drawings and their description hereinbefore illustrate rather than limit the invention.

Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps.

What is claimed is:

1. A method of separating a hydrocarbon multiphase fluid mixture, the hydrocarbon fluid mixture (E) comprising an oil phase, a water phase and a gas phase, the method comprising:
   an application step in which the hydrocarbon fluid mixture (E) is applied to a separator that separates by gravity the hydrocarbon fluid mixture (E) into a liquid layer and a gas layer, the liquid layer being constituted by a water-enriched layer and an oil-enriched layer, the liquid layer being separated from the gas layer by a gas/liquid interface (GLI) having a liquid level (LL) in the separator,
   wherein the method further comprises:
   a) an extraction step in which the oil-enriched liquid (O) is extracted from the oil-enriched layer at an oil flow rate (Qo), and in which the water-enriched liquid (W) is extracted from the water-enriched layer at a water flow rate (Qw),
   b) a liquid-level measurement step in which the liquid level (LL) is measured,
   c) a level-based adjustment step in which one of the flow rates selected from the group consisting of the oil flow rate (Qo) and the water flow rate (Qw) is adjusted so that the liquid level is maintained at a pre-set liquid level value (LLSP), d) a parameter measurement step in which a parameter representative of an impurity ratio present in one of the extracted liquids selected from the group consisting of oil-enriched liquid (O) and water-enriched liquid (W) is measured, and e) a parameter-based adjustment step in which the flow rate not selected in step c) is adjusted so that the parameter representative of an impurity ratio is maintained at a pre-set parameter value.

2. The method of separating a hydrocarbon multiphase fluid mixture according to claim 1, wherein the parameter representative of an impurity ratio is a water/liquid ratio (WLR) value in the extracted oil-enriched liquid (O).

3. The method of separating a hydrocarbon multiphase fluid mixture according to claim 1, wherein the parameter representative of an impurity ratio is a water/liquid ratio (WLR) value in the extracted water-enriched liquid (W).

4. The method of separating a hydrocarbon multiphase fluid mixture according to claim 1, wherein the parameter representative of an impurity ratio is a water/liquid ratio (WLR) value at a determined location in the separator.

5. The method of separating a hydrocarbon multiphase fluid mixture according to claim 1, wherein the parameter representative of an impurity ratio is a height of a water/emulsion interface (WEI) level (IL).

6. The method of separating a hydrocarbon multiphase fluid mixture according to claim 1, wherein the parameter representative of an impurity ratio is a height of an emulsion/oil (EOI) level.

7. The method of separating a hydrocarbon multiphase fluid mixture according to claim 1, wherein the parameter representative of an impurity ratio is a thickness (Eo) of the oil-enriched layer.

* * * * *